Patented Aug. 23, 1938

2,127,716

UNITED STATES PATENT OFFICE 2,127,716

PROCESS OF HYDROGENATING FATTY ACIDS

Otto Brücke, Hochspeyer, Germany, assignor to American Lurgi Corporation, New York, N. Y., a corporation of New York No Drawing. Application May 8, 1936, Serial No. 78,639. In Germany May 24, 1935

7 Claims. (Cl. 260—409)

This invention relates to a process of hydrogenating fatty acids.

It is known that the properties of oils and fats can be modified by hydrogenation. The most important change is the raising of the melting point, but other partly desirable and partly undesirable modifications also occur, including those affecting the flavor and aroma. The accretion of hydrogen, known, for short, as "hardening", is influenced, on the one hand, by the presence of a catalyst, and also by a physical condition dependent on the temperature and pressure. A special problem in hardening is to attain a desired selectivity, which may be regarded as hardening by stages, carried out, for example, in such a manner that constituents having three or more unsaturated linkages are saturated, whilst those with only one or two unsaturated linkages remain wholly or partially unchanged because the maintenance or recovery of such fatty acids is desired and advantageous in the subsequent treatment.

The opinion of those skilled in the art is that selectivity in hardening is favored by operating under low pressures and, on the other hand, at high temperatures. In this connection, reference may be made to Schönfeld's work "Die Hydrierung der Fette", 1932, page 121, last line of first paragraph. For hardening fatty acids, this perception has been applied in practice, and it can be shown that the hydrogenation of fatty acids is always performed at high temperatures, mostly above 180° C. (compare the statements by Dr. Normann in "Chemiker Zeitung" 1935, No. 25, page 255, right-hand column, where 180–200° C. is specified as the normal hardening range).

It has now been ascertained that working methods which may be suitable for neutral oils and fats, frequently fail to furnish satisfactory results in the treatment of fatty acids and even give rise to difficulties. The employment of high temperatures in the treatment of fatty acids is not beneficial, since it leads to the formation of lactones; and it has unexpectedly transpired that high temperatures are not required at all, for the hardening process, but that adequate results can be obtained at lower temperatures, of the order of 130° C., which, in certain circumstances may be reduced to 100° C. or even less, provided that a relatively high pressure, such as about 25 atmospheres, be applied. A still more unexpected fact which has been ascertained in connection with this novel method of treating fatty acids is that the selectivity is in no wise impaired or destroyed. Thus, it was observed in hydrogenating a train oil fatty acid, that the solidification point increased to only a slight extent during the first part of the treatment, whereas, on the other hand, hydrogen was extensively absorbed. Consequently, such hydrogen must have been taken up by liquid fatty acids, without direct formation of the high-melting, fully saturated stearine (fatty acids). The accuracy of this deduction was confirmed by the hexabromide test.

It has already been proposed to reduce unsaturated fatty acids and their glycerides with hydrogen by the contact method, according to which the oil to be reduced is heated to moderate temperature and caused to react at a pressure of about 18 atmospheres with hydrogen heated to a higher temperature (from about 200–250° C.).

It has moreover been proposed to hydrogenate unsaturated fatty acids or their esters by treating such compounds with hydrogen under a pressure of at least thirty atmospheres (preferably over fifty atmospheres) in the presence of a catalyst consisting of one or more of the metals nickel, cobalt or iron.

In contradistinction thereto, the present invention provides a process of hardening fatty acids and mixtures of fatty acids with neutral oils or fats, in which fatty acids having a plurality of unsaturated linkages are present, characterized in that the fatty acids with a plurality of unsaturated linkages are converted into fatty acids containing one or two unsaturated linkages by treatment with hydrogen at a temperature between 80° and 130° C., and at a pressure of the order of 25 atmospheres.

It was also ascertained that the process according to the invention can also be employed with advantage, not only when dealing with pure fatty acids, but also with mixtures of fatty acids with neutral oils or fats (such as crude oils containing fatty acids) which hitherto were neutralized prior to being hardened. As a rule, in treating such mixtures of fatty acids and neutral fats, all that is requisite or advisable is to put the material through a preliminary process of purification, in which such impurities as dirt, mucinous bodies or the like, are eliminated.

Although, in itself, there is nothing novel in the hardening of fatty acids, the industrial application of such a process has hitherto received little attention, and it is only of late that the problem has become of importance in industry. Actually, the attempts to harden fatty acids have often been attended by difficulties, which are mainly attributable to the circumstance that the knowledge acquired in the hardening of neutral fats has been applied to the hardening of fatty acids, because its suitability for that purpose was taken for granted. This circumstance therefore, adds to the importance of the hereindescribed new method of treating fatty acids, in which the selective course of the hardening process is in no wise impaired, and in which moreover, hydrogenation is successfully performed in cases where the application of the working principles hitherto customary has led to difficulties. The invention is therefore based on the novel perception that what is to be considered as incorrect in treating neutral materials, is precisely that which is advantageous and essential to success in the hardening of fatty acids.

The invention will now be illustrated with reference to the following example.

The originating material employed is distilled train oil fatty acid. Such material contains, as has been found by experiments and confirmed in the present case by Halphen's hexabromide test, considerable quantities of fatty acids containing three and more unsaturated linkages (linolenic and clupanodenic acids). The iodine number of this originating material was 112.0. 105 kg. of this material were hardened with hydrogen by the process of the present invention, nickel formate being used as catalyst in amounts of 0.26% nickel on the basis of the fatty acids. The autoclave was provided with the customary heating coil which was also adapted simultaneously to cool the contents of the autoclave if required. It was also provided with stirring equipment and apparatus for measuring the temperature and pressure, and for taking samples. Hydrogen was added to the autoclave in such quantities that a positive pressure of 25 atmospheres was generated therein in about 10 minutes. The same time was also required for heating up the preheated materials to the reaction temperature. The hardening process was performed with the exclusion of air which was first removed from the autoclave in known manner. The figures for the variation of temperature and pressure during the hardening are given in the following table, beginning at a time at which the contents of the autoclave were heated to 59° C. and were standing under a positive hydrogen pressure of 13 atmospheres.

| Time | | Temperature | Positive pressure in atmospheres |
|---|---|---|---|
| Hours | Minutes | °C. | |
| 14 | 45 | 59 | 13 |
| 15 | 5 | 91 | 25 |
| 15 | 27 | 90 | 25 |
| 15 | 38 | 96 | 25 |
| 15 | 58 | 93 | 25 |
| 16 | 3 | 93 | 25 |

After 78 minutes had expired the hardening was completed. The iodine number amounted to 57.0, and the hexabromide test gave a completely negative result. This therefore showed that no more triple and poly-unsaturated linkages were present in the fatty acids. The material obtained in this manner is eminently suitable for the soap industry, specially because all the fatty acids having a plurality of unsaturated linkages which would impair the durability and quality of the soaps, have been removed by the hardening process of the present invention.

The heating of the autoclave was discontinued when the contents thereof reached a temperature of 78° C. On account of the rapid hardening which, as is known, proceeds in an exothermic manner, the temperature quickly rose without any external supply of heat, to 90° C. Therefore, in order to prevent any substantial rise above and beyond this temperature, heat was withdrawn from the contents of the autoclave in the later stages of the hardening by cooling.

The end point of the hardening can easily be determined during the operation by softening point determinations which can be rapidly carried out. This is done by continually taking test samples during a preliminary experiment, whereby both the softening point and also the iodine number can be ascertained. If the actual hardening process be then carried out on the same material and under the identical conditions as in the case of the preliminary experiment the softening point determinations may be used without any further precaution in the place of the iodine determinations, which latter take up a considerably longer time, and are therefore less suitable for controlling the process. Once the softening point has been reached which corresponds to the desired iodine number, this is an indication that the hardening process is at an end.

What I claim is:

1. A process for hydrogenating free fatty acids without increasing the amount of completely saturated fatty acids substantially which comprises treating a mixture consisting principally of free fatty acids having one, two, three and more than three unsaturated linkages with hydrogen in the presence of a catalyst at a temperature of about 80° C. to about 130° C. at a pressure of about 25 atmospheres of hydrogen until free fatty acids having three or more unsaturated linkages are converted into free fatty acids having one and two unsaturated linkages without substantial increase of fully saturated free fatty acids.

2. A process for hydrogenating free fatty acids without increasing the amount of completely saturated fatty acids substantially which comprises reacting hydrogen with a mixture consisting principally of free fatty acids having one, two, three and more than three unsaturated linkages and devoid of substantial amounts of fatty acid esters in the presence of a catalyst at a temperature of about 80° C. to about 130° C. at a hydrogen pressure of about 25 atmospheres until the hexabromide test is negative whereby a mixture of neutralized fatty acids in small amounts and free fatty acids having less than three unsaturated carbon linkages are produced without substantial increase of completely saturated free fatty acids and without the formation of lactones.

3. A process for hydrogenating free fatty acids without increasing the amount of completely saturated fatty acids substantially which comprises freeing a mixture consisting principally of free fatty acids having one, two, three and more than three unsaturated linkages of mucous bodies, heating in the presence of hydrogen and a catalyst to a slightly elevated temperature of not more than 130° C. while increasing the hydrogen pressure to about 25 atmospheres, maintaining said hydrogen pressure until free fatty acids having more than three unsaturated carbon linkages are converted into free fatty acids having one and two unsaturated linkages substantially without reducing the unsaturation of free fatty acids having one and two unsaturated linkages.

4. A process for hydrogenating free fatty acids without increasing the amount of completely saturated fatty acids substantially which comprises reacting hydrogen with a mixture devoid of substantial amounts of fatty acid esters and consisting principally of free fatty acids having one, two, three and more than three unsaturated linkages at a temperature of about 80° C. to about 130° C. in the presence of an amount of catalyst less than about 0.5% by weight of the mixture of free fatty acids and under a pressure of about 25 atmospheres of hydrogen until free fatty acids having three and more than three unsaturated linkages have been converted into free fatty acids having one and two unsaturated linkages whereby a mixture containing preponderant amounts of free fatty acids having one, two, three and more than three unsaturated linkages is hydrogenated to a mixture containing free fatty acids having one and two unsaturated linkages without a substantial increase in the amount of completely saturated free fatty acids.

5. A process for hydrogenating free fatty acids devoid of substantial amounts of fatty acid esters which comprises reacting hydrogen with free fatty acids having one, two, three, and more than three unsaturated linkages in the presence of a catalyst at a temperature of about 80° C. to about 130° C. at a pressure of about 25 atmospheres until the solidification point is indicative of an iodine number of about 57 whereby fatty acids having one, two, three and more than three unsaturated linkages are hydrogenated without substantial increase in the amount of completely saturated free fatty acids.

6. A process for hydrogenating free fatty acids having a plurality of unsaturated linkages which comprises reacting hydrogen with free fatty acids having one, two, three and more than three unsaturated linkages in the presence of a catalyst at a temperature of about 80° C. to about 130° C. at a pressure of about 25 atmospheres of hydrogen until a mixture of free fatty acids having one and two unsaturated linkages is obtained whereby a mixture consisting principally of free fatty acids having one, two, three and more than three unsaturated linkages is converted into a mixture consisting principally of acids having one and two unsaturated linkages substantially without increasing the amount of completely saturated fatty acids.

7. A process for hydrogenating free fatty acids which comprises reacting hydrogen with free fatty acids having one, two, three and more than three unsaturated linkages in the presence of a catalyst at a temperature of about 80° C. to about 130° C. at a hydrogen pressure of about 25 atmospheres until free fatty acids having three and more than three unsaturated linkages are reduced to free fatty acids having one and two unsaturated linkages without substantial increase in the amount of completely saturated fatty acids.

OTTO BRÜCKE.